United States Patent [19]

Ree et al.

[11] Patent Number: 4,954,578

[45] Date of Patent: Sep. 4, 1990

[54] FINE DOMAIN COMPOSITE FILMS OF POLYIMIDE MIXTURES

[75] Inventors: Moonhor Ree, Wappingers Falls, N.Y.; Sally A. Swanson, Calif.; Willi Volksen, both of San Jose, Calif.; Do Y. Yoon, Los Gatos, Calif.

[73] Assignee: International Business Machines Corporation, Armonk, N.Y.

[21] Appl. No.: 262,559

[22] Filed: Oct. 25, 1988

[51] Int. Cl.$^5$ ............................................. C08L 79/08
[52] U.S. Cl. ..................................... 525/432; 525/428; 528/342
[58] Field of Search ................. 525/432, 428; 528/342

[56] References Cited

U.S. PATENT DOCUMENTS

| | | | |
|---|---|---|---|
| 3,416,994 | 12/1968 | Chalmers et al. | 525/428 |
| 3,500,426 | 2/1971 | Adesko | 525/428 |
| 4,207,407 | 6/1980 | Helminiak et al. | 525/425 |
| 4,228,218 | 10/1980 | Takayanagi et al. | 525/58 |
| 4,309,531 | 1/1982 | Kyritsos et al. | 528/339 |
| 4,336,175 | 6/1982 | Gibbs | 524/726 |
| 4,535,101 | 8/1985 | Lee et al. | 521/189 |
| 4,544,713 | 10/1985 | Tsai et al. | 525/432 |
| 4,631,318 | 12/1986 | Hwang et al. | 525/432 |

Primary Examiner—Lewis T. Jacobs
Assistant Examiner—Vasu S. Jagannathan
Attorney, Agent, or Firm—Joseph G. Walsh; Robert B. Martin

[57] ABSTRACT

Thin films of polyimide having electrical insulation, low thermal expansion, high glass transition temperature, and good adhesion are made by dispersing fine domains of relatively flexible polyimide which is fluorinated in a matrix of relatively rigid polyimide.

5 Claims, No Drawings

FINE DOMAIN COMPOSITE FILMS OF POLYIMIDE MIXTURES

DESCRIPTION

1. Technical Field

The present invention is concerned with fine domain composite films of polyimide mixtures. The films simultaneously possess the properties of electrical insulation, low thermal expansion, high glass transition temperature, and good adhesion.

2. Background Art

U.S. Pat. Nos. 4,207,407, 4,228,218, 4,309,531, 4,544,713 and 4,631,318 deal with composites and copolymers of rigid rod and flexible polymers. None of these patents, however, employs any rod-precursor flexible polymers that are later inverted in-situ to rodlike polymers. None of these patents discloses any fluorinated polyimide, and relatively rigid polyimide precursors.

U.S. Pat. No. 4,336,175 shows the use of a fluorinated polyimide in the preparation of laminates. U.S. Pat. No. 4,535,101 shows the preparation of a fluorinated polyimide and its use in making foams.

DISCLOSURE OF THE INVENTION

According to the present invention, polyimide films are provided which simultaneously possess several properties formerly believed to be mutually exclusive. The films have a low dielectric constant, low thermal expansion, high glass transition temperature, and good adhesion. The films comprise fine domains of about 1 μm diameter of relatively flexible fluorinated polyimide in a matrix or relatively rigid polyimide. The domains constitute from about 10 to 40% by weight of the total polyimide and the matrix constitutes from about 60 to 90% by weight of the total polyimide.

All polyimides are made from two components: (1) an aromatic tetraacid derivative (anhydride or diester) and (2) an aromatic diamine. In the practice of the present invention, the polyimide which forms the matrix is preferably made from an acid portion which is either biphenyl tetracarboxylic dianhydride (BPDA) or pyromellitic dianhydride (PMDA). The matrix diamine portion is preferably made from p-phenylene diamine (PDA) or oxydianiline (ODA). In the fine domain of the films, the acid portion of polyimide is preferably biphenyl tetracarboxylic dianhydride (BPDA) or hexafluorodphthallic anhydride (6F). The diamine portion of the domain is preferably 2,2-bis[4-(p-aminophenoxy)-phenyl]hexafluoropropane (BDAF). The domain polyimide contains at least one component which is fluorinated. This feature is an essential elment of the present invention.

In the practice of the present invention, the molecular weights of the polyimides are those obtained by ordinary condensation polymerization, that is they are within the range from about 10,000 to about 50,000.

Polyimides have been used successfully as a dielectric in chip wiring, and a large effort has been directed at using polyimides as a dielectric in some levels of the first-level package. The demand for polyimides, or alternate high temperature polymers, for the future packaging and chip applications is increasing very rapidly nowadays. However, these advanced applications demand the combination of properties which are contradictory for a given polymer structure. One example is a lower thermal expansion exhibited by rodlike polymers with extremely high $T_g$, but good self-adhesion exhibited by easily interdiffusing flexible polymers with relatively lower $T_g$. Another example is a low dielectric (ca. 2.5) constant shown by polymers, including polyimides, with considerable amount of perfluorinated groups in the chain, which in turn lowers the $T_g$ and leads to higher thermal expansion coefficients.

The present invention circumvents these contradictory requirements by forming fine-domain composite structures of relatively rigid polyimide and flexible polyimide mixtures in thin films. Prior to the present invention, the efforts so far have been hampered by the intrinsic immiscibility of rigid and flexible polymers in any appreciable concentration. The present invention instead employs suitable rodlike or semirigid polyimide precursors which remain flexible before imidization and hence can be mixed with flexible polymers in considerable concentrations. Processing conditions are then chosen to coat the miscible precursor solutions and then to dry the solvent, followed by conversion of the flexible rod-precursor (semirigid-precursor) to the rodlike (semirigid) polymer. Furthermore, this invention results in the formation of fine-domain (ca. 1 μm or less) composite structures, essential for thin film applications, in the fully cured films.

The following examples are given solely for purposes of illustration, and are not be considered limitations of the present invention, many variations of which will occur to those skilled in the art, without departing from the scope or spirit thereof.

EXAMPLE 1

Mixtures of a rod-precursor polymer, meta-PMDA-PDA diethyl ester (I) (Mw~20,000), and a flexible polymer, 6F-BDAF amic acid (II) (Mw~20,000), were prepared in N-methyl pyrrolidone (NMP) solutions.

The ternary phase diagram shows a rather broad miscibility range for the total polymer concentration of ca. 20%, covering a practical range of rod-flexible ratios. miscible ternary solutions were then coated on the glass slide and first heated at 70°–100° C. for 30–60 minutes, followed by heating for 30–60 minutes at each of 150°, 200° and 300° C., and then by final cure at 400° C. for one hour. After the final cure, both the optical microscopic and light scattering measurements showed the formation of fine-domain structures of ca. 0.5–2 μm in size for the 90/10, 80/20, 70/30, 60/40, 30/70, 20/80, and 10/90 20/80 in rod/flexible ratios (=PMDA-PDA/6F-BDAF, w/w), whereas the 50/50 and 40/60 mixtures showed the presence of very large (15–60 μm) domains.

The results of tensile modulus versus temperature show that the $T_g$ of 6F-BDAF is ca 270° C., and the same $T_g$ is also shown in the 30/70 and 70/30 composites, proving that we do have well phase-separated domains. Furthermore, the large drop in the tensile modulus in the 30/70 composite versus a very small drop in the 70/30 case shows that in the 30/70 case the matrix is the flexible polyimide (6F-BDAF) whereas in the 70/30 rod-flexible mixture the rodlike polyimide (PMDA-PDA) becomes the matrix.

The results of the dielectric constant $\epsilon'$ and tan δ at 40 kHz as a function of temperature demonstrate again that the phase separation is nearly ideal as marked by the identical temperatures of the onset of $\epsilon'$ rise and tan δ maximum in 6F-BDAF, 30/70 and 70/30 rod-flexible composites. Furthermore, the lowering of the dielectric constant with increasing 6F-BDAF content is also demonstrated in these fine-domain composite structures.

The thermal expansion coefficient (TEC) was measured to be ca. 5 ppm/°C. for PMDA-PDA homopolymer and ca. 55 ppm/°C. for 6F-BDAF. In comparison, the 70/30 (rod/flexible) composite film exhibited a TEC of ca. 12 ppm/°C. while the 30/70 mixture showed a TEC of 50 ppm/°C. These TEC results are again consistent with the two-phase structures with different matrix phases.

The 70/30 composite films show excellent mechanical properties with 6.6 GPa in tensile modulus, 6% in elongation-at-break. In comparison, the PMDA-PDA has a modulus of 9.4 GPa and an elongation of 3%. The 6F-BDAF homopolymer has a modulus of 2.6 GPa and yield strain of 7%, and the 30/70 mixture shows only small differences with 3.7 GPa modulus and 7% yield strain.

Self-adhesion of the second layer coated and cured in the manner described above onto the first layer that has been fully cured at 400° C. was strong in both the 30/70 and 70/30 compositions that it was impossible to separate the layers at all, regardless of what polymer forms the matrix phase. Thus, the interdiffusion of the flexible polyimide is found to occur at the inter-layer interface, and consequently near-perfect adhesive strength between the layers is obtained.

EXAMPLE 2

Mixtures of a semirigid polyimide precursor, PMDA-ODA diethyl ester (I) (Mw~20,000), and a flexible polymer, 6F-BDAF amic acid (II), were prepared in NMP solutions to form a miscible ternary solution of NMP/I/II approximately 80/16/4 in weight ratios.

Miscible ternary solutions were then coated on the glass slide and first heated at 70°-100° C. for 30-60 minutes, followed by heating for 30-60 minutes at each of 150°, 200° and 300° C., and then by final cure at 400° C. for one hour, to obtain coatings of ca. 30 μm thickness. After the final cure, both the optical microscopic and light scattering measurements showed the formation of fine-domain structures of ca. 0.5-1 μm in size with the majority PMDA-ODA forming the matrix.

Self-adhesion of the second layer coated and cured in the manner described above onto the first layer fully cured at 400° C. for one hour exhibited a very surprising L-peel adhesive strength of ca. 50 g/mm for this 80/20 (PMDA-ODA/6F-BDAF, w/w) composite; in comparison, the PMDA-ODA alone showed a value of ca. 1-5 g/mm under identical preparation and measurement conditions.

The results of tensile modulus versus temperature show that the $T_g$ of 6F-BDAF is ca. 270° C., and the same $T_g$ is also shown in the 80/20 composite, proving that we do have well phase-separated domains. Furthermore, only a small drop of tensile modulus around 270° C. for the 80/20 composite shows that the semirigid PMDA-ODA forms the matrix phase.

Since the PMDA-ODA forms the matrix with 6F-BDAF as the dispersed phase, the outstanding mechanical toughness and elongation-at-break of PMDA-ODA should be maintained while the dielectric constant and water permeability decrease in this composite.

EXAMPLE 3

Mixtures of a semirigid polyimide precursor, BPDA-PDA dimethyl ester (I), and a flexible polymer, BPDA-BDAF amic acid (II) were prepared in NMP solution to form a miscible ternary solution of NMP/I/II approximately 84/11/5 in weight ratios. (It is preferred that at least one of the components is alkyl ester.)

Miscible ternary solutions were then coated on the glass side and first heated at 80° C. for ca. 60 minutes, followed by heating for 30-60 minutes at each of 150°, 200° and 300° C., and then by final cure at 400° C. for ca. 90 minutes, to obtain a coating of ca. 20 μm thickness. After the final cure, both the optical microscopic and light scattering measurements showed the formation of the fine-domain structures of ca. 0.5-1 μm in size with the majority BPDA-PDA forming the matrix.

The results of dynamic tensile modulus versus temperature show that the softening temperature or glass transition ($T_g$) of BPDA-BDAF is ca. 270° C., and the same $T_g$-relaxation is shown in this 70/30 (BPDA-PDA/BPDA-BDAF, by weight) composite, proving that we do have well phase-separated domains. Furthermore, only a small drop of tensile modulus around 270° C. for the 70/30 composite shows that the semirigid BPDA-PDA, with its $T_g$ above 500° C., forms the matrix phase.

The 70/30 composite films show excellent mechanical properties with 6.7 GPa in tensile modulus, 26% in elongation-at-break. In comparison the BPDA-PDA has a modulus of 9.1 GPa and an elongation of 26%, whereas the BPDA-BDAF homopolymer has a modulus of 2.9 GPa at the ambient.

Self-adhesion of the second layer, coated and then cured in the manner described above, onto the first layer which had been fully cured in the same manner exhibited a very surprising L-peel adhesive strength of ca. 75 g/mm for this 70/30 composite; in comparison, the BPDA-PDA alone showed a value less than 1-3 g/mm under identical preparation and measurement conditions.

We claim:

1. A thin film of polyimide having a glass transition temperature above 400° C, and good adhesion, said film comprising fine domains of about 1 μm diameter or smaller of relatively flexible fluorinated polyimide containing at least one fluorinated component in an amount from about 10-40% by weight of the total polyimide dispersed in a matrix of relatively rigid polyimide in an amount from about 60-90% by weight of total polyimide.

2. A thin film of polyimide as claimed in claim 1 wherein the matrix is formed from biphenyl tetracarboxylic dianhydride and p-phenylene diamine BPDA-PDA, pyromellitic dianhydride and p-phenylene diamine PMDA-PDA or pyromellitic dianhydride and oxydianiline PMDA-ODA and the fine dispersions are formed from biphenyl tetracarboxylic dianhydride and 2,2-bis(4-(p-aminophenoxy) phenyl) hexafluoropropane BPDA-BDAF or hexafluorodiphthallic anhydride and 2,2-bis(4-(p-amino-phenoxy) phenyl) hexafluoropropane 6F-BDAF.

3. A thin film of polyimide as claimed in claim 1 wherein the molecular weights of the polyimides are within the range of 10,000 to 50,000.

4. A thin film of polyimide as claimed in claim 1 wherein the dispersion polyimide is formed from 2,2-bis[4-p-aminophenoxy)phenyl]hexafluoropropane.

5. A thin film of polyimide having a low dielectric constant, low thermal expansion, high glass transition temperature, and good adhesion, said film comprising fine domains less than 1 μm in diameter of a polyimide formed from biphenyl tetracarboxylic dianhydride and 2,2-bis[4-p-aminophenoxy)phenyl]hexafluoropropane in about 30% by weight of the total polyimide dispersed in a matrix of a polyimide formed from biphenyl tetracarboxylic dianhydride and phenylene diamine in an amount of about 70% by weight of the total polyimide.

* * * * *